(12) United States Patent
Kaeb et al.

(10) Patent No.: US 7,544,031 B2
(45) Date of Patent: Jun. 9, 2009

(54) GRAIN BIN HAVING POWER SWEEP DRIVEN BY BELT CONVEYOR THROUGH CLUTCH SYSTEM

(75) Inventors: Todd W. Kaeb, Cissna Park, IL (US); Steven R. Walder, Hoopeston, IL (US)

(73) Assignee: KSI Conveyors, Inc., Cissna Park, IL (US)

( * ) Notice: Subject to any disclaimer, the term of this patent is extended or adjusted under 35 U.S.C. 154(b) by 447 days.

(21) Appl. No.: 11/215,078

(22) Filed: Aug. 30, 2005

(65) Prior Publication Data

US 2006/0072989 A1    Apr. 6, 2006

Related U.S. Application Data

(60) Provisional application No. 60/606,620, filed on Sep. 1, 2004.

(51) Int. Cl.
*B65G 1/00* (2006.01)
*B65G 65/00* (2006.01)

(52) U.S. Cl. ................ 414/310; 414/318; 414/319; 414/306

(58) Field of Classification Search ......... 414/304–312, 414/327, 332, 287, 318–319; 74/76; 198/667, 198/835, 844.1, 674
See application file for complete search history.

(56) References Cited

U.S. PATENT DOCUMENTS

| | | | | | |
|---|---|---|---|---|---|
| 3,233,755 | A | * | 2/1966 | Glenn | 414/310 |
| 3,237,788 | A | * | 3/1966 | Weaver et al. | 414/307 |
| 4,008,816 | A | * | 2/1977 | Harrison | 414/310 |
| 4,330,233 | A | * | 5/1982 | Weaver | 414/310 |
| 4,585,385 | A | | 4/1986 | Buschbom et al. | |
| 4,627,702 | A | * | 12/1986 | Anderson | 399/165 |
| 4,957,199 | A | * | 9/1990 | Wokke et al. | 198/847 |

* cited by examiner

*Primary Examiner*—Gregory W Adams
(74) *Attorney, Agent, or Firm*—Wildman, Harrold, Allen & Dixon LLP

(57) ABSTRACT

A power sweep for an agricultural grain bin includes a powered belt conveyor adapted to unload the grain when desired. The inboard end of the belt conveyor includes an idler roller which is frictionally coupled to the inner surface of the belt and, through a power transmission, may be actuated, by means of a clutch, to drive a power sweep for cleaning residual grain from the bottom of the storage bin after the belt conveyor has removed the bulk of the grain.

6 Claims, 4 Drawing Sheets

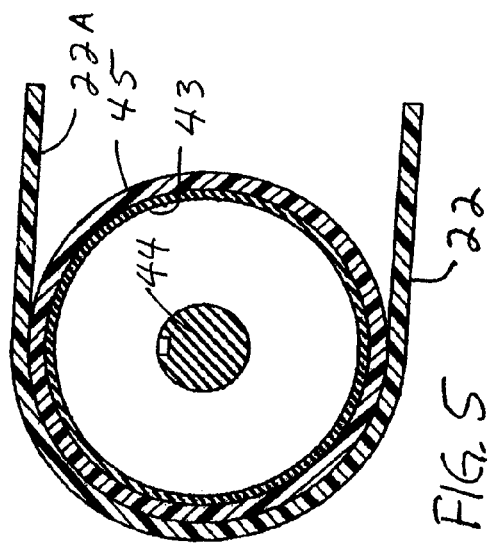
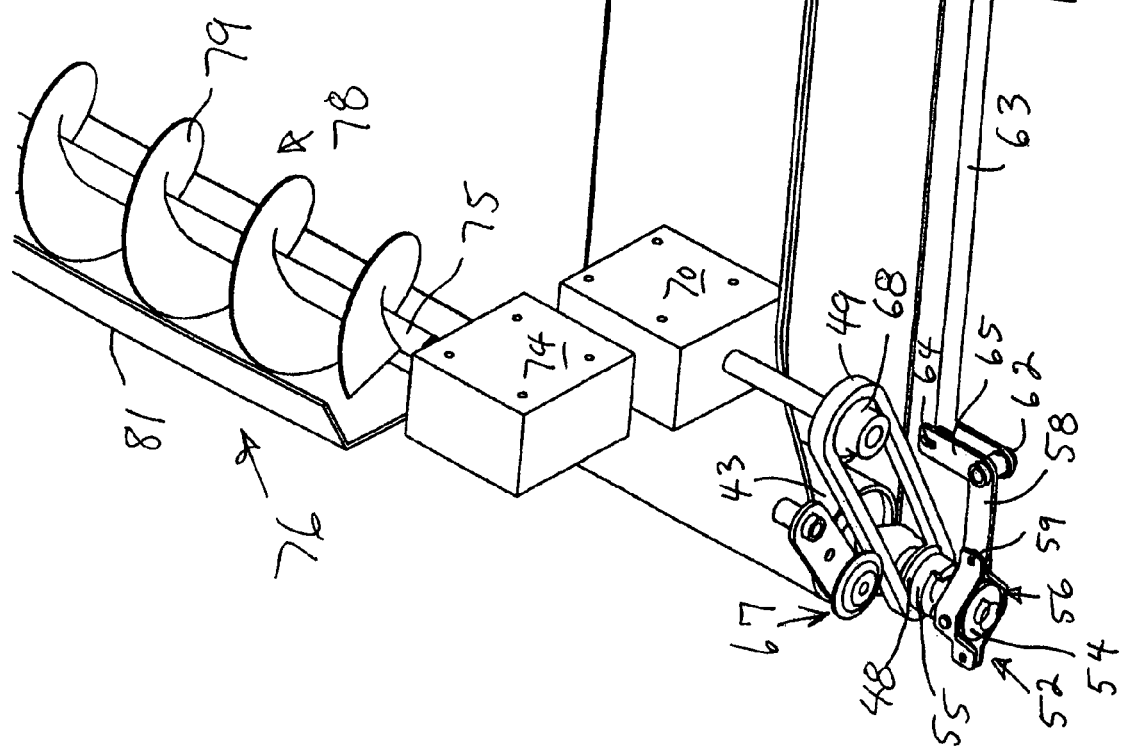

GRAIN BIN HAVING POWER SWEEP DRIVEN BY BELT CONVEYOR THROUGH CLUTCH SYSTEM

RELATED APPLICATION

This application claims the benefit of the filing date of U.S. Provisional Application No. 60/606,620 filed on Sep. 1, 2004 for "BELT CONVEYOR POWER SWEEP".

FIELD OF THE INVENTION

The present invention relates to power sweeps for agricultural grain storage bins, and, more particularly, to power sweep devices used principally, but not exclusively, for removing residual grain from a grain storage bin after a conveyor has removed most of the stored grain by means of an underlying conveyor fed by a series of radially spaced openings or wells formed in a floor, through which the grain is delivered to the conveyor by gravity.

BACKGROUND OF THE INVENTION

One object, as well as an advantage of the invention, is to utilize a belt conveyor to remove most of the grain stored in a grain bin, and then to use the same conveyor to transmit power to a bin sweep device for removing residual grain from the grain storage bin. Grain storage structures (grain bins) of the type with which the present invention is concerned, include a concrete foundation providing a floor, and on which a series of formed steel rings (i.e. corrugated cylindrical sections) are joined and extend upward to form a cylindrical tank. Many such grain bins have perforated steel floors supported on the concrete foundation and spaced above the floor of the foundation, for purposes of passing air upwardly through the stored grain for aeration of the grain to control the drying and moisture content of the grain and thereby preserve the grain and reduce loss.

Horizontal unloading augers have been principally used in the past to remove the grain from the bin. These augers are placed between or in the concrete foundation and the perforated steel floor, if one is present, or in a trough formed in the foundation; and they extend from the center of the bin through the side wall to several feet outside the bin for discharge into another mass flow auger or conveyor for subsequent transport to market or other use. The unloading auger carries grain away from an enclosed metal frame (well) at the center of the grain bin. The grain flows via gravity into the center well onto the auger. The center well typically has a moveable slide gate which can be operated from outside the grain bin to control grain flow through the well.

Eventually, the bin empties to the point where no additional grain can flow under gravity into the center well, leaving residual grain on the outer edges of the floor of the grain bin extending from the center well and sloping upwards to the outer wall of the bin. The remaining grain, referred to as the residual grain, is considerable, rising from a few inches near the center to as much as ten or twelve feet at the outer wall, for larger diameter bins. The residual grain which, of course, is valuable, is commonly removed from the bin via a powered horizontal sweep auger. This powered horizontal sweep auger rests on the perforated floor and may be placed over the unloading auger prior to filling the grain bin. Commonly, additional intermediate wells are placed over the unloading auger to remove grain from around the powered horizontal sweep auger so it is free of the residual grain pile prior to commencing its rotary "sweep" operation.

The powered horizontal sweep auger is then utilized to move the residual grain from the grain bin by moving the grain toward the center well for transport out of the bin via the unloading auger under the perforated floor. The powered sweep auger is driven mechanically from the central support shaft of the flighted unloading auger and employs a rotating friction wheel on the floor, at its far end, close to the grain bin wall, to continuously drive the sweep auger (which then rotates about the center of the bin) into the residual grain pile. The powered sweep auger rotates angularly, like the hand of a clock, about the center well, delivering the residual grain to the unload auger, until the grain bin is emptied of its contents.

Recent improvements have been made to grain bin unloading systems for purposes of reducing damage to grain. This damage is related to the clearance fit and steel flighting used in conventional unloading auger systems. Belt conveyors fitted under the perforated grain bin floor in place of auger unloading systems are now being employed to minimize damage to high value seed, as well as to improve energy efficiency and reduce unload time.

One limitation to expanding belt conveyor application for unloading grain bins has been the lack of convenient, economical means of driving a horizontal power sweep for removing the residual grain in a grain bin. A belt typically includes a drive roller supported with bearings adjacent a power source, a rubber or plastic material-based belt, and an idler roller supported with bearings at the distal (inboard) end of the belt, in one common form. The belt may be smooth, textured or cleated and ride in a flat or curvilinear support structure. The belt is wrapped around the drive roller and the idler roller, the ends are laced together, the belt is then tensioned by a device at either the drive or idler roller, and the drive roller and belt are driven by an electric or hydraulic motor at the drive roller.

The motor and drive roller are typically located exterior of the bin at or near the discharge of the belt conveyor, whereas the idler roller is located at the center well of the grain bin. The belt conveyor is positioned under the perforated metal grain bin floor and may employ additional intermediate wells for removal of residual grain to clear the region about the power sweep before it is actuated. The drive roller typically employs a bonded rubber coating to provide sufficient traction to transmit power to the conveyor belt.

SUMMARY OF THE INVENTION

The present invention provides a means of driving a horizontal power sweep via the belt conveyor. The present invention utilizes a bonded rubber coating on the idler roller at the center of the bin to efficiently and effectively transmit power from the driven belt to the idle roller. The idler roller is coupled by an actuatable clutch to the power drive or transmission which is adapted to drive the power sweep device in the grain bin. The transmission may include a chain sprocket or V-belt drive and an appropriate angle gear box to transmit power from the idler roller. A clutch in the drive train is engaged/disengaged manually from outside the grain bin via a control rod. The control rod actuates a linkage that engages a clutch assembly to couple the idler roller shaft to the drive chain sprocket. A right angle gearbox, if used, may be located above the belt conveyor adjacent the center of the grain bin. From the gearbox output, a variety of different kinds of power sweep units can be driven. Thus, the term "power sweep" is intended to be construed broadly, to include, but not limited to, augers, belts or other conveyors for moving residual grain from the outer reaches of a grain bin to the center well.

The inboard idler roller of the driven conveyor in the present invention can also be utilized to transmit power to the power sweep by a number of drive mechanism, including, but not limited to chain and sprocket, (as in the illustrated embodiment), V-belt or hydraulic motor, or other equivalent forms of power transmission.

One advantage of the present invention is that it facilitates re-fitting existing grain storage bins of the type described, using augers to unload the bin, with more desirable belt conveyors as the unload mechanism. By arranging for a drive coupling from the conveyor belt to the idler roller, the existing power sweep which was in the bin before the retrofit, may be used with only minor changes or adaptions.

Other objects of the present invention will become apparent to persons skilled in the art to which the present invention pertains based on the following description along with the accompanying drawings. While the invention has been described in specific detail for grain handling applications, it is evident that many alternatives, modifications and variations will be apparent to those skilled in the art.

BRIEF DESCRIPTION OF THE DRAWINGS

FIG. 4 is a perspective view, taken from the top and left side of the innermost portion of the unload conveyor, also showing the transmission and clutch assembly for coupling power from the driven idler pulley to drive the power sweep; and FIG. 5 is a fragmentary vertical cross section of the idler roller and conveyor belt.

DETAILED DESCRIPTION OF THE ILLUSTRATED EMBODIMENT

Figure 1:
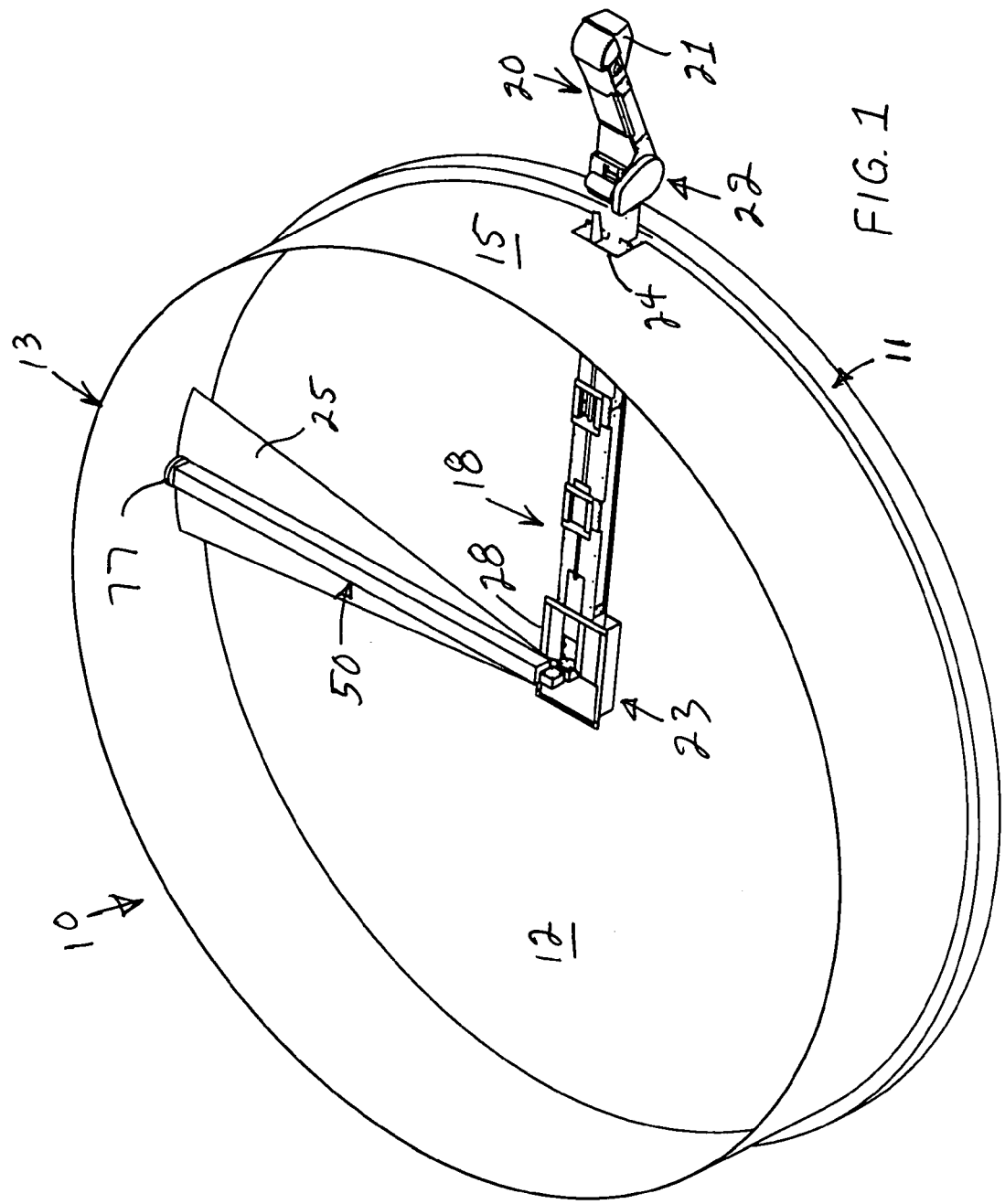
FIG. 1 is an upper perspective view of the lower portion of a grain storage bin incorporating the present invention, with only a portion of the perforated bin floor shown to view the unload conveyor, and the upper portion of the side wall removed.

Referring first to FIG. 1, reference numeral 10 generally designates the lower portion of a grain storage bin, including a concrete foundation 11 providing a floor, which also is formed of concrete and provides a horizontal upper surface 12. The bin also includes an upright cylindrical side wall 13, only the lower section of which is shown. Typically, the side wall 13 is assembled to any desired height, using a number of similar sections such as the one shown at 15, which may be cylindrical in plan view and formed of corrugated metal, the corrugations running circumferentially. The individual bin sections 15 are conventionally placed, one above another, and fastened together by conventional means to form a cylindrical storage bin of any desired height.

Still referring to FIG. 1, supported on the top surface 12 of the concrete foundation 11, is a belt conveyor system 18, sometimes referred to as the unload conveyor, including a conventional power source generally designated 22, which may include a hydraulic or electric motor. The belt conveyor 18 also includes a discharge conveyor section 20 which feeds the grain through a discharge spout 21, as is known, for further distribution or transport to market.

Coupled to the unload conveyor 18, at its idler or inboard end, is a power sweep 25, shown in diagrammatic form in FIG. 1, which extends radially outwardly along a perforated metal floor 25, shown only partly in FIG. 1, so that the unload belt conveyor may be seen.

The unload conveyor system 18 includes a continuous belt 22, and is thus commonly referred to as a belt conveyor. As is conventional, the belt conveyor 18 is used to remove grain stored in the bin for use or for transportation. The grain is conveyed radially outward along the conveyor belt 22 through an opening 24 in the side wall 15 to the discharge section 20, where it may be raised for delivery to a wagon, truck or other vehicle for transportation, or into storage bins to be handled by material handling machines, as is common practice.

As mentioned, and as will be further described within, the belt conveyor has an inboard end generally designated 23 which is located adjacent the center of the grain storage bin 10—that is, the inboard end 23 of the conveyor 18 lies adjacent the axis of the cylindrical side wall 13 of the seed bin, although it is not necessary for operation of the invention that the side wall of the bin be truly cylindrical or that the conveyor 18 end at the center of the bin, as will be appreciated.

Figure 2:
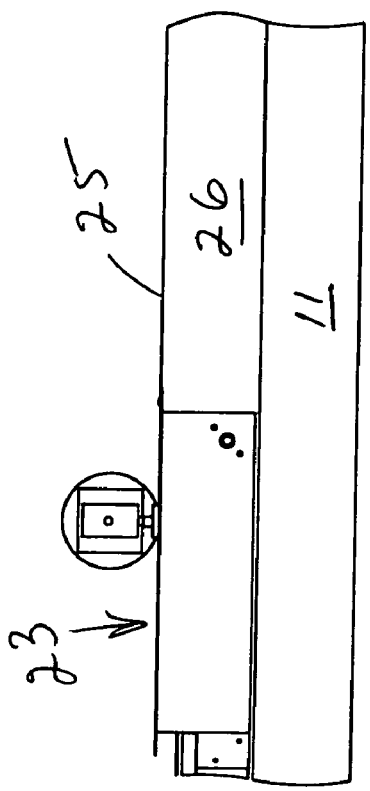
FIG. 2 is a vertical cross section side view of the lower portion of the grain storage bin of FIG. 1, taken through the center of the bin, with portions of both the right and left portions of the unload conveyor removed for clarity.
Figure 2:
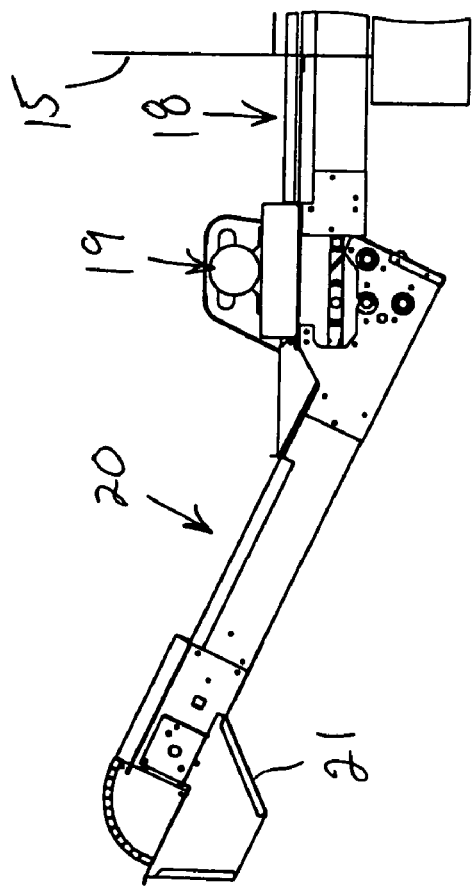

Referring now to FIG. 2, the portion of the belt conveyor system 18 which resides within the side wall 13 of the seed bin 10, is located on the foundation 11 beneath a metal floor 25 which is perforated in such a manner that grain stored in the bin does not fall through the floor 25 and into the space which houses the conveyor 18.

Returning to FIG. 1, the perforated bin floor 25 may be supported by mounts located on the upright bin side wall 13 (omitted from FIG. 1 for brevity), as well as by stands resting on the foundation. The center line of the unload belt conveyor 18 lies generally along a radial line of the circular foundation 11. Spaced in this radial direction are a number of openings or wells adapted to pass grain under gravity from within the bin onto the conveyor belt 22 for delivery to the outboard discharge section 20 of the conveyor system, and through the conveyor discharge spout 21, as described above.

A center well is designated 28, and the others, located progressively further from the center of the bin, are designated 29 and 30. Typically, there may be three wells. The center well 28 is fitted with a discharge gate, in the form of a sliding plate, as will be described. The other wells 29, 30 may be similarly arranged, but of different size, if desired.

When the wells are open, grain within the bin flows through the wells and is deposited onto the upper surface of the conveyor belt 22 which transports the grain radially outwardly through opening 24 in the side wall 15 and through the discharge end 21 of the conveyor.

As is well known, with the arrangement just described, there is a considerable residue of grain left within the storage bin. As persons knowledgeable in farm practices understand, the residual grain left inside the bin is generally at floor level above the center well 28 (and along the radially located wells it is low), but the depth increases substantially from the axis of the bin out to the side wall 13 proceeding outwardly in all directions other than over the wells 29-31. Depending upon the diameter of the side wall 13, the grain standing adjacent the inner surface of the side wall 13, may rise as high as ten or twelve feet, and tapers downwardly to the level of the floor 25 at the center, according to the angle of repose for the particular grain being stored, which of course depends on the size and characteristics of the grain.

Figure 3:
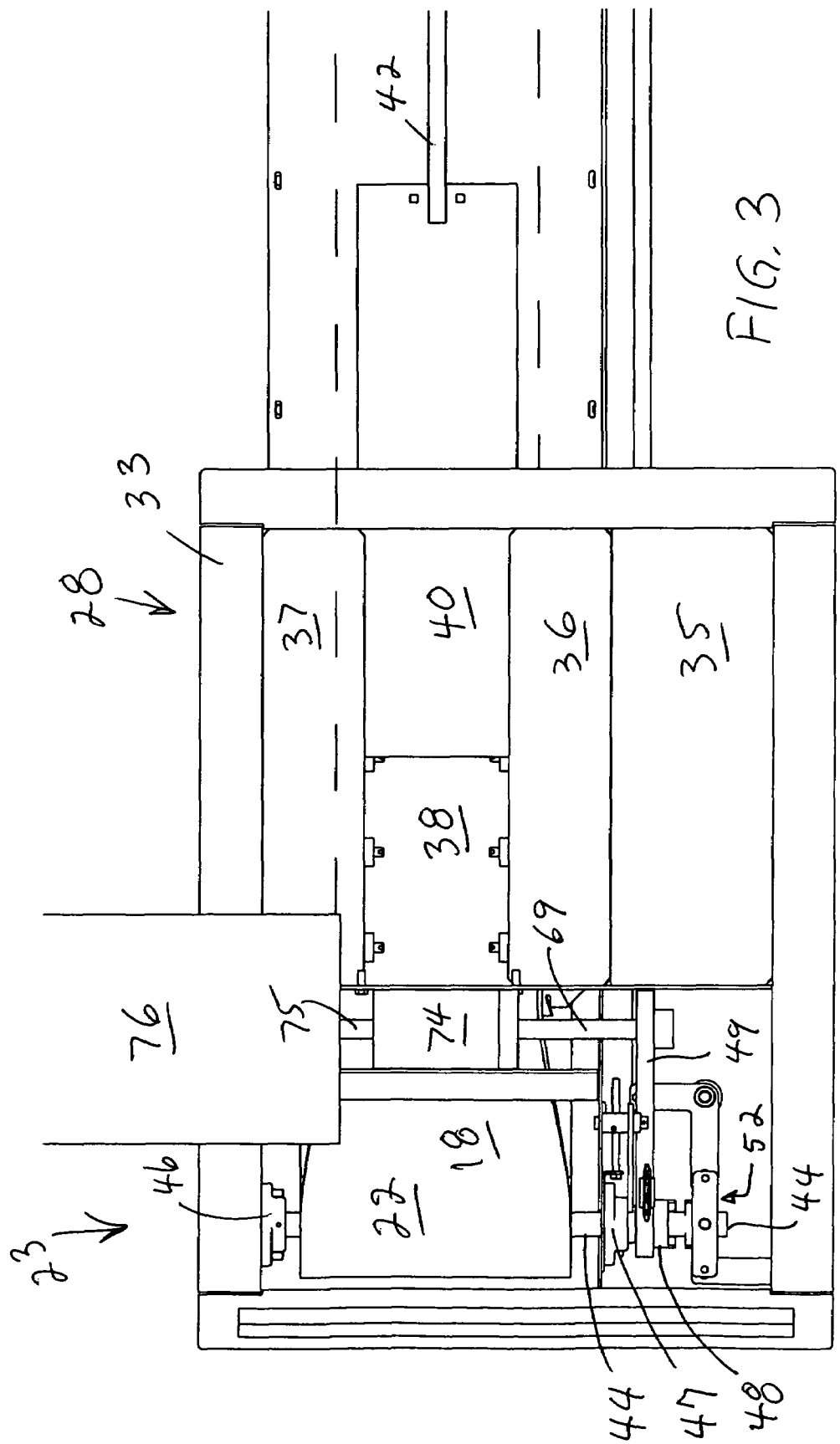
FIG. 3 is a top fragmentary view of the inboard end of the conveyor, showing the driven idler pulley and the transmission and clutch assembly connected to the power sweep (shown diagrammatically)

Turning now to FIGS. 3 and 4, the center well 28 includes a metal frame 33 which supports downwardly inclined plates or pans 35, 36 and 37 which funnel grain located above the well 23, under gravity into a center opening 38 which is fitted with a sliding door 40 forming a gate. To the outboard end of the slide door 40 is connected a control rod or actuating handle 42. When the rod 42 is pulled from outside the bin, the slide 40 moves outwardly, and is shown in a partially opened position in FIG. 3, permitting grain to fall through the opening 38 onto the underlying conveyor belt 22 where the grain is carried radially outwardly as described above. The left side of the center wall 23 may be fitted with a horizontal upper plate, which is omitted in FIG. 3 to view the inboard end of the conveyor system 18.

The inboard end of the conveyor belt 22 is in partial wrapping engagement of, and supported by a roller 43 (best seen in FIG. 4), mounted on an idler shaft 44. The outer surface of the inboard or idler roller 43 is provided with a high friction material 45 (see FIG. 5), such as molded urethane or rubber having a high coefficient of friction, like the outboard or drive roller. The inner surface 22A of the belt 22 is generally provided with a similar high friction, yielding material such as rubber or urethane so that there is a frictional coupling between the conveyor belt 22 and the idler roller 43. Thus, with the frictional engagement between the inner surface 22A of the conveyor belt 22 and the outer covering 45 of idler roller 43, the idler shaft 44 is driven or powered.

The shaft 44 is mounted at one side by a bearing block or housing 46, and at the left side (when viewed from the perimeter looking toward the center), by a similar bearing housing 47. The shaft 44 is coupled by a transmission and clutch assembly, to be described, to the power sweep, shown in diagrammatic form in FIG. 3 and designated 50. Idler shaft 44 extends through the bearing housing 47 and is fitted with a sprocket 48 driving a chain 49, which in turn drives a sprocket 68 (see FIG. 4). The chain 49 (shown in diagrammatic form for simplicity) and sprockets 48, 68 could be replaced by a belt and pulley arrangement, or other suitable coupling mechanism, as will be understood by those skilled in the art. All such coupling or drive mechanisms are collectively referred to herein as power transmissions or drives, whether or not the angular velocity of the shafts 44, 69 are the same because this is a matter of choice and application. That is, gearing could be included, if desired.

Still referring to FIGS. 3 and 4, interposed between the driven shaft 44 and the sprocket 48 and chain 49, is a clutch assembly generally designated 52. The clutch assembly 52 may be of the type used in current power sweeps, which includes first and second clutch members which, when moved axially together, have mating, engaging teeth for transmitting torque from the drive clutch member 54 (received from the idler shaft 44) to the driven clutch member 55. Thus, the clutch member 54 is keyed to the shaft 44, and it is mounted within a cradle or housing 56 (for example, by means of a tongue-in-groove connection) which permits the driving member 54 to freely rotate within housing 56, but restricts movement of the clutch member 54 axially of the shaft 44. When the housing 56 is translated axially of the drive shaft 44, as by means of an L-shaped actuating lever 58 which is pivotally mounted at 59 to the well 23 at 62, the clutch member 54 also moves axially of shaft 44 to engage clutch member 55.

An actuating link or rod 63 is pivotally mounted at 64 to the distal end of the L-shaped link of the linkage 58 and extends outside the bin, permitting an operator manually to engage or disengage the clutch.

Thus, when the rod 65 is pulled from outside the grain bin, it is translated to the right in FIG. 4, causing the L-shaped link 58 to rotate clockwise about the axis of its pivot support 62, thus translating the clutch plate support 56 toward the upper right (when viewed as in FIG. 4) and causing the mating clutch plates 54, 55 to enter driving engagement, permitting the transfer of power from the shaft 44 to a shaft 69.

A tension idler 67 may be mounted in the well, or to the inner frame of the pulley, for tensioning the chain 49. The chain 49 is entrained around a second sprocket 68 which drives the shaft 69 which is fed into a right angle coupler 70 (i.e. gear box) having a vertical shaft 71 received in a second right angle coupler 74, the output shaft of which 75 drives a power sweep diagrammatically represented at 76.

The power sweep 76 may be any number of devices. One such conventional device, seen in FIG. 4 includes an auger 78 having flights 79, and mounted on shaft 75, the outboard end of which is fitted with a wheel (77 in FIG. 1) resting on the upper surface of the perforated floor 12 just immediately adjacent the inside surface of the side wall 15 so that as the shaft 75 of the power sweep 76 is driven, the outboard wheel turns and moves the power sweep circumferentially about the floor 12, while the auger flights 79 are driven, and cooperating with a back plate 81 extending partially about the rear portion of the auger, to draw residual grain radially toward the center and into the center well 28.

Other power sweeps, adapted to be rotated circumferentially about the floor of the bin, such as a helical broom mounted on a center shaft, or any functionally equivalent device may equally well be employed.

It will be appreciated that, with the power sweep stored above the discharge wells, an operator, without moving from the conveyor outlet, may first power the conveyor to unload the bulk of the contents of the bin, and then engage the clutch of the power sweep, after it has been cleared of grain, to engage the power sweep and clean out the residual grain.

Having thus disclosed in detail the illustrated embodiment of the invention, persons skilled in the art will be able to modify certain of the structure which has been illustrated and to substitute equivalent structure for that which has been disclosed, while continuing to practice the principle of the invention. It is therefore, intended that all such modifications and substitutions be covered as they are embraced within the spirit and scope of the appended claims.

We claim:

1. Apparatus for unloading an agricultural grain bin, comprising:

a powered conveyor including a continuous conveyor belt extending generally radially along a bottom of said grain bin to transport grain outwardly from a center of said bin through an upright side wall of said bin, said conveyor including at least an inboard roller having a horizontally oriented shaft having a horizontally oriented external extension extending laterally of said conveyor belt and located adjacent said center of said bin, wherein said shaft and said extension rotate about a common axis of rotation, said belt entrained about said inboard roller and in frictional driving engagement therewith, thereby to supply power to said shaft of said inboard roller;

an actuatable clutch having a first clutch member fixed to said external extension of said shaft of said roller and a second, actuatable clutch member mounted for axial motion along said external extension when actuated;

an elongated actuator member coupled at an inboard end to said second clutch member to actuate the same, and accessible from a location outside of said bin;

a power transmission coupled to said second clutch member; and a power sweep having an input member spaced apart relative to said to shaft and coupled to said power transmission and powered thereby, when said actuator member is actuated, said power sweep extending radially of said bin and including a driven grain-gathering device for moving grain inwardly toward the center of said bin and delivering the gathered grain to said belt conveyor.

2. The apparatus of claim 1 wherein said roller includes an outer covering of compressible high friction material.

3. The apparatus of claim 2 wherein said covering material is selected from the group of rubber and urethane.

4. The apparatus of claim 2 wherein said conveyor belt is flexible and includes an inner layer of flexible high friction material bonded thereto.

5. The apparatus of claim 4 wherein said inner layer of said belt is a material selected from the group of rubber and urethane.

6. The apparatus of claim 1 wherein said power transmission includes a chain and sprocket drive coupled to said shaft of said inboard roller; and wherein said power sweep includes a shaft driven by said chain and sprocket drive.

* * * * *